(No Model.) 2 Sheets—Sheet 1.

L. WESTON.
LAWN SHEARS.

No. 361,911. Patented Apr. 26, 1887.

Witnesses,
H. E. Remick
Henry Chadbourn.

Inventor.
Lon Weston.
by Alban Andrew
his atty (No Model.) 2 Sheets—Sheet 2.

L. WESTON.
LAWN SHEARS.

No. 361,911. Patented Apr. 26, 1887.

Witnesses
H. E. Remick
Henry Chadbourn

Inventor
Low Weston
by Alban Andrew
his atty

UNITED STATES PATENT OFFICE.

LON WESTON, OF BROCKTON, MASSACHUSETTS.

LAWN-SHEARS.

SPECIFICATION forming part of Letters Patent No. 361,911, dated April 26, 1887.

Application filed September 27, 1886. Serial No. 214,606. (No model.)

*To all whom it may concern:*

Be it known that I, LON WESTON, a citizen of the United States, and a resident of Brockton, in the county of Plymouth and State of Massachusetts, have invented new and useful Improvements in Lawn-Shears, of which the following, taken in connection with the accompanying drawings, is a specification.

This invention relates to improvements in lawn-shears; and its object is to provide a convenient tool for trimming grass that may lie over the borders of walks in lawns, and for clipping that which may be left standing about buildings, hedges, fences, trees, posts, &c., out of reach of the ordinary lawn-mower.

The invention is also useful for trimming hedges and terraces.

Figure 1:
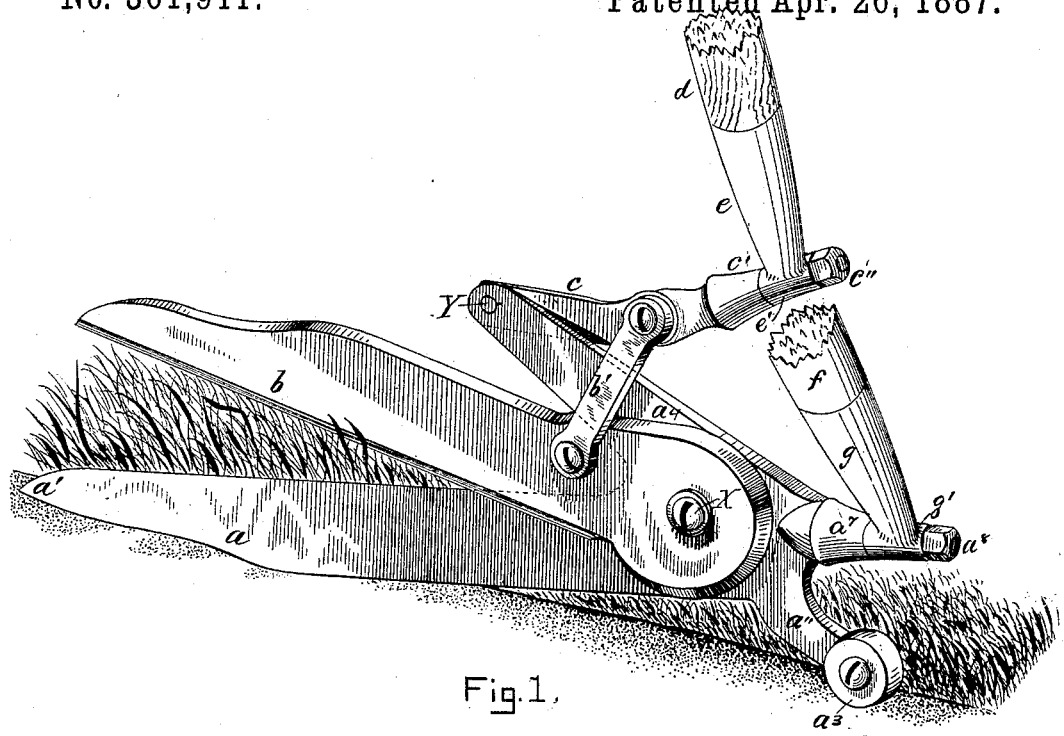
Figure 2:
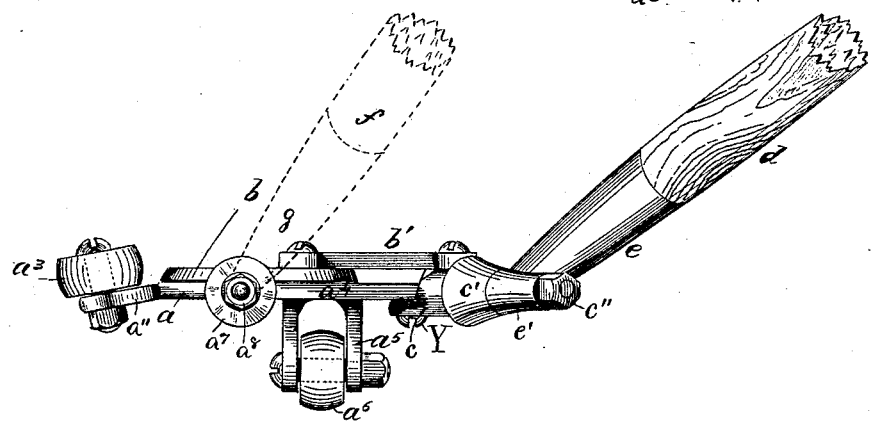
Figure 6:
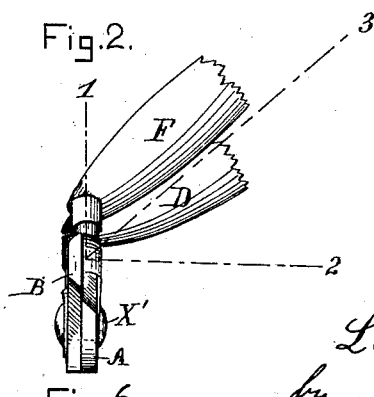
Figure 3:
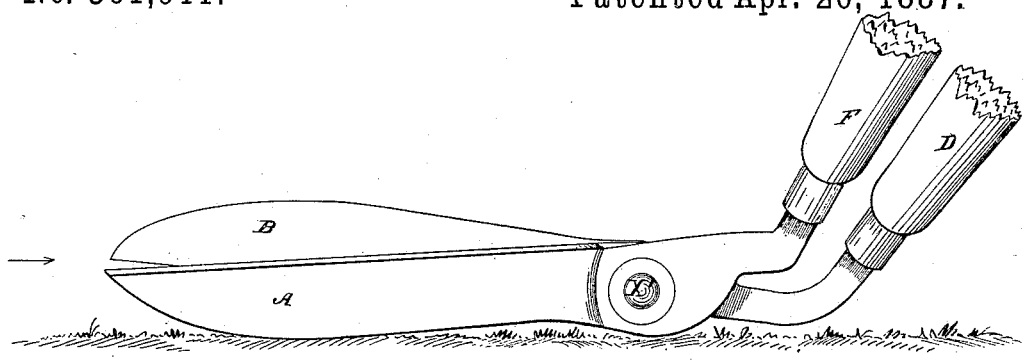
Figure 4:
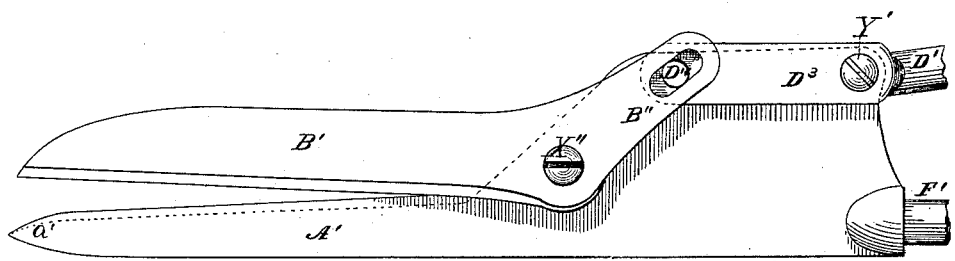
Figure 5:
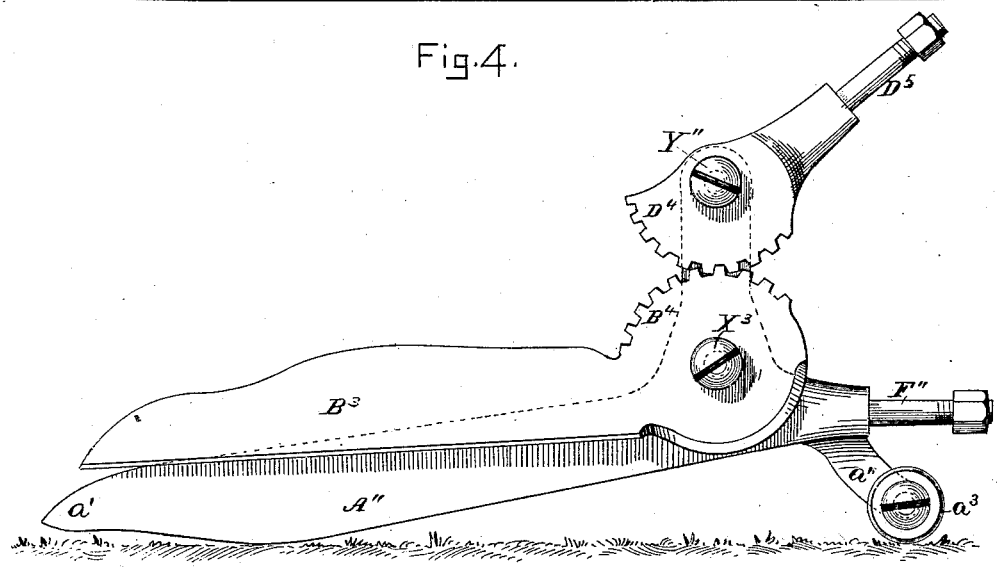

In the drawings, Figure 1 represents a perspective view of my improved lawn-shears. Fig. 2 represents a back view of the invention, shown as being used in a horizontal position. Fig. 3 represents a side elevation of a pair of ordinary shears having the handles arranged relative to the blades according to my invention. Figs. 4 and 5 represent modifications of the connecting mechanism for operating the shear-blades, and Fig. 6 represents a point end view of a pair of ordinary shears having the handles arranged according to my improved manner.

Similar letters refer to similar parts wherever they occur on the different parts of the drawings.

In Figs. 1 and 2, $a$ represents the lower or right-hand blade of the shears, the forward pointed end of which is curved or inclined, as shown at $a'$ in Fig. 1, and this is made for the purpose of collecting or picking up the grass to be cut. To the rear end of the right-hand blade $a$ is secured in a suitable manner the truck-plate $a''$, provided with a pin, bolt, or screw, on which is loosely journaled the vertical, or nearly so, truck-wheel $a^3$. (Shown in Figs. 1 and 2.) By means of a rivet or screw-bolt, X, is pivoted the upper or left-hand blade, $b$, to the lower or right-hand blade, $a$, as shown in Fig. 1.

The shear-blade $a$ has an upwardly and forwardly projecting arm, $a^4$, to the outer end of which is pivoted, at $y$, the lever $c$, the rear end of which forms a spindle, $c'$, to which the handle $d$ is secured, preferably in an adjustable manner, for which purpose the said handle is inserted in a socket, $e$, having cast in one piece with it the shank-socket $e'$, that is slipped over the spindle or shank $c'$, which latter, as well as the socket $e'$, is made tapering and secured together by means of a nut, $c''$, (shown in Figs. 1 and 2,) or may be adjustably secured by means of set-screws or equivalent devices; and $b'$ is a link pivoted to and connecting the blade $b$ and lever $c$, as shown in Figs. 1 and 2. The forward end of arm $a^4$ is inclined and made to project toward the points of the shears, so that its fulcrum $y$, to which the lever $c$ is pivoted, is located between the fulcrum X and points of the shears, by which the device is made very compact, so as to enable the shears to be used to great advantage in a very small space, if required.

To the rear end of the blade $a$, or to its projection or arm $a^4$, is secured or made in one piece with it the bearing $a^5$, in which is journaled on a pin, bolt, or rivet the truck-wheel $a^6$, the axis of which is arranged parallel, or nearly so, to the shear-blades, as shown in Fig. 2, and I term this the "horizontal truck-wheel."

$a^7$ is a shank or spindle forming a rear extension of the blade $a$, to which the handle $f$ is secured, preferably in an adjustable manner, in the same way as the handle $d$ is secured to its spindle $c'$, the handle $f$ being for this purpose inserted in a socket, $g$, having cast in one piece with it the shank-socket $g'$, that is slipped over the spindle or shank $a^7$, the latter, as well as the socket $g'$, being made tapering and secured together by means of a nut, $a^8$. (Shown in Figs. 1 and 2.)

The handles $d$ and $f$ are each arranged at an angle oblique to a longitudinal vertical plane of the shears, whether the shears stand vertically or lie flat or inclined, or, in other words, between the longitudinal plane of the shears $a\ b$ and a plane perpendicular thereto, as shown in Figs. 1, 2, and 6, such handles projecting backward diagonally from the shears between the said planes, as shown by dotted lines marked 1, 2, and 3 in Fig. 6, the chief purpose being to adjust the handles to angles nearly forty-five degrees to the said planes, with an angle or space between the handles convenient for working, so that the shears can be used in a vertical position for trimming the edges of walks, as well as in a horizontal position, without changing the angles of the handles relative to the shear-blades.

I am aware that ordinary shears are made with handles in the plane of the shears projecting upward when the blades are vertical for the purpose of trimming the edges of walks; but such shears can only be used practically in a vertical position, or nearly so; and I am also aware that ordinary shears have been made with handles lying in the vertical planes of the shears, as shown in the well-known hedge-shears, which can only be used practically in a horizontal position, or nearly so. By having the blades of the shears and handles arranged obliquely to each other, as described, the operator is enabled to use the shears equally well for cutting horizontally, vertically, or on an inclined plane without materially changing his position and without the need of changing the position of the handles relative to their respective blades.

In using the improved lawn-shears for cutting vertically—as, for instance, in trimming the edges of lawns where they join walks, as shown in Fig. 1—the blades are held in a vertical plane, or nearly so, with the truck-wheel $a^3$ running on the ground, the operator guiding the blade $a$ by means of the handle $f$ and raising and depressing the handle $d$, and for this kind of work the handles may be adjusted so as to be in a plane with the plane of the shears, although I prefer to have the planes of handles and blades in different planes, as hereinbefore mentioned.

In using the shears for cutting horizontally the blades are operated in a horizontal, or nearly so, plane, the truck-wheel $a^6$ running on the ground and the blades $a\,b$ being opened and closed by manipulating the handles $d\,f$, and during such operation the handles may be adjusted so as to be in planes at right angles to the longitudinal plane of the shears, although I prefer to have the planes of handles and blades oblique to each other, as hereinbefore mentioned.

In Figs. 3 and 6, A and B represent a pair of ordinary lawn or hedge shears pivoted together at X' and having the respective handles F D arranged at different angles, but in a plane located between the plane of the blades and a plane at right angle thereto, as hereinafter mentioned, as will be fully understood by reference to Figs. 3 and 6.

Fig. 4 represents a modification for operating the shears, and in said figure A' is one of the blades, having shank F', to which a handle may be secured and arranged in position relative to the blade, as heretofore shown and described; and B' represents the other blade, pivoted to blade A' by means of bolt or rivet X'', the blade B' having a slotted extension, B'', in the slot of which plays the pin D'' on the lever $D^3$, the latter being pivoted at Y' to the rear of blade A' and provided with shank D', to which a handle is to be attached and arranged in position relative to the shear-blades, as heretofore mentioned.

Fig. 5 shows another modification for operating and connecting the blades, and in said figure A'' represents one of the blades, and $B^3$ represents the other, said blades being pivoted together at $X^3$, as shown. F'' is the shank on blade A'', to which a handle is to be secured, as hereinbefore mentioned. The blade $B^3$ is provided in its rear end with a segmental gear, $B^4$, meshing with a similar segmental gear, $D^4$, secured to or forming part of the shank $D^5$, to which a handle is to be secured, and arranged in position relative to the shear-blades as above described, said segmental gear $D^4$ being pivoted at Y'' to a projection on the rear end of the blade A'', as shown in dotted lines in Fig. 5.

Having thus fully described the nature, construction, and operation of my invention, I wish to secure by Letters Patent, and claim—

1. In lawn-shears, a pair of blades pivoted together and having handles for their operation, arranged to extend at an angle oblique to the longitudinal vertical plane of the shears, whether the blades stand vertically or lie horizontally or inclined, as and for the purpose set forth.

2. In lawn-shears, a pair of blades pivoted together and provided with handles made adjustable to various angles relative to the shear-blades, as and for the purpose set forth.

In testimony whereof I have signed my name to this specification, in the presence of two subscribing witnesses, on this 24th day of September, A. D. 1886.

LON WESTON.

Witnesses:
ALBAN ANDRÉN,
HENRY CHADBOURN.